US012786467B2

(12) United States Patent
Jung et al.

(10) Patent No.: US 12,786,467 B2
(45) **Date of Patent: *Nov. 3, 2026**

(54) METHODS AND DEVICES FOR CODING AND DECODING A MULTI-VIEW VIDEO SEQUENCE

(71) Applicant: ORANGE, Issy les Moulineaux (FR)

(72) Inventors: Joël Jung, Chatillon Cedex (FR); Patrick Boissonade, Chatillon Cedex (FR)

(73) Assignee: ORANGE, Issy les Moulineaux (FR)

( * ) Notice: Subject to any disclaimer, the term of this patent is extended or adjusted under 35 U.S.C. 154(b) by 29 days.

This patent is subject to a terminal disclaimer.

(21) Appl. No.: 18/939,665

(22) Filed: Nov. 7, 2024

(65) Prior Publication Data

US 2025/0071328 A1 Feb. 27, 2025

Related U.S. Application Data

(63) Continuation of application No. 18/298,625, filed on Apr. 11, 2023, now Pat. No. 12,167,036, which is a (Continued)

(30) Foreign Application Priority Data

Mar. 15, 2019 (FR) ...................................... 1902659

(51) Int. Cl.

| | |
|---|---|
| ***H04N 19/597*** | (2014.01) |
| ***G06T 9/00*** | (2006.01) |
| ***H04N 19/44*** | (2014.01) |

(52) U.S. Cl.

CPC ............ *H04N 19/597* (2014.11); *G06T 9/00* (2013.01); *H04N 19/44* (2014.11)

(58) Field of Classification Search

CPC ...... H04N 19/597; H04N 19/44; H04N 19/46; G06T 9/00

See application file for complete search history.

(56) References Cited

U.S. PATENT DOCUMENTS

| | | | | |
|---|---|---|---|---|
| 11,323,717 | B2 * | 5/2022 | Zhao | H04N 19/132 |
| 11,348,284 | B2 * | 5/2022 | Tourapis | H04N 19/88 |

(Continued)

FOREIGN PATENT DOCUMENTS

| | | | |
|---|---|---|---|
| EP | 2515539 | A1 | 10/2012 |
| EP | 2942953 | A | 11/2015 |

(Continued)

OTHER PUBLICATIONS

International Search Report dated Jun. 12, 2020 for corresponding International Application No. PCT/FR2020/050394, Feb. 27, 2020.

(Continued)

*Primary Examiner* — Tat C Chio

(74) *Attorney, Agent, or Firm* — David D. Brush; Westman, Champlin & Koehler, P.A.

(57) ABSTRACT

A method for decoding a data stream representing a multi-view video, including coded data representative of at least one sub-image, including texture data and depth data associated with the texture data, the sub-image including at least one zone, referred to as a useful zone, for generating an image of a view. An indicator is decoded, indicating whether the sub-image is coded according to a first method or a second method. When the indicator indicates that the sub-image is coded according to the first method, a binary map is decoded indicating for at least one pixel of the sub-image whether the pixel belongs to the useful zone. When the indicator indicates that the sub-image is coded according to the second method, the texture and depth data of the sub-image are decoded. The depth data of the sub-image for (Continued)

the pixels situated outside the useful zone includes a decoded depth value.

18 Claims, 6 Drawing Sheets

Related U.S. Application Data continuation of application No. 17/439,173, filed as application No. PCT/FR2020/050394 on Feb. 27, 2020, now Pat. No. 11,659,203.

(56) References Cited

U.S. PATENT DOCUMENTS

| | | | | |
|---|---|---|---|---|
| 11,659,203 | B2 * | 5/2023 | Jung | H04N 19/46 375/240.12 |
| 12,167,036 | B2 * | 12/2024 | Jung | H04N 19/46 |
| 2010/0310155 | A1 | 12/2010 | Newton et al. | |
| 2011/0080464 | A1 | 4/2011 | Alessandrini et al. | |
| 2012/0262545 | A1 | 10/2012 | Kerbiriou et al. | |
| 2014/0241433 | A1 * | 8/2014 | Bosse | H04N 19/463 375/240.16 |
| 2021/0176496 | A1 | 6/2021 | Chupeau et al. | |

FOREIGN PATENT DOCUMENTS

| | | | |
|---|---|---|---|
| JP | 2011-525769 | A | 9/2011 |
| JP | 2012-105031 | A | 5/2012 |
| JP | 2014-132721 | A | 7/2014 |
| JP | 2016-529785 | A | 9/2016 |
| WO | 2015007348 | A1 | 1/2015 |

OTHER PUBLICATIONS

Written Opinion of the International Searching Authority dated Jun. 12, 2020 for corresponding International Application No. PCT/FR2020/050394, filed Feb. 27, 2020.

Bart Kroon (Philips) et al., "Philips response to 3DoF+ Visual CfP", No. m47179, Mar. 18, 2019 (Mar. 18, 2019), 126. MPEG Meeting; Mar. 25, 2019-Mar. 29, 2019; Geneva; (Motion Picture Expert Group or ISO/IEC JTC1/SC29/WG11), XP030211013.

"PCC Test Model Category 2 v0", 120. MPEG Meeting; Oct. 23, 2017-Oct. 27, 2017; Macau; (Motion Picture Expert Group or ISO/IEC JTC1/SC29/WG11), No. N17248, Dec. 15, 2017 (Dec. 15, 2017), XP030023909.

"3DoF+ Software Platform Description", No. n17761, Aug. 1, 2018 (Aug. 1, 2018), 123. MPEG Meeting; Jul. 16, 2018-Jul. 20, 2018; Ljubljana; (Motion Picture Expert Group or ISO/IEC JTC1/SC29/WG11), XP030190608.

Christian Theobalt et al., "Model-Based Free-Viewpoint Video: Acquisition, Rendering, and Encoding", 24. Picture Coding Symposium; Dec. 15, 2004-Dec. 17, 2004; San Fransisco, Dec. 15, 2004 (Dec. 15, 2004), XP030080156.

English translation of the Written Opinion of the International Searching Authority dated Jun. 25, 2020 for corresponding International Application No. PCT/FR2020/050394, filed Feb. 27, 2020.

Renaud Dore (Technicolor) et al., "[MPEG-I Visual] RVS based 3DoF+ Evidence", No. m44588, Oct. 9, 2018 (Oct. 9, 2018), 124. MPEG Meeting; Oct. 8, 2018-Oct. 12, 2018; Macao; (Motion Picture Expert Group or ISO/IEC JTC1/SC29/WG11), XP030193168.

Notice of Allowance and Fees Due for U.S. Appl. No. 17/439,173, mailed Jan. 18, 2023, 10 pages.

Japanese Notice of Reasons for Rejection dated Mar. 4, 2024, for corresponding Japanese Application No. 2021-555500.

Ying Chen et al., Test Model 11 of 3D-HEVC and MV-HEVC [online], JCT3V-K1003 (JCT3V-K1003.docx), [retrieved on Feb. 20, 2024], Internet <URL: http://phenix.itsudparis.eu/jct3v/doc_end_user/documents/11_Geneva/wg11/JCT3V-K1003-v1.zip>, May 1, 2015, pp. 1, 6-30.

Fabian Jager, Depth-based Block Partitioning for 3D Video Coding [online], Published in: 2013 Picture Coding Symposium (PCS), [retrieved on Feb. 20, 2024], Feb. 12, 2014, pp. 410-413, Internet <URL: https://ieeexplore.ieee.org/stamp/stamp.jsp? tp=&arnumber=6737770>, DOI: 10.1109/PCS.2013.6737770.

Notice of Allowance and Fees Due for U.S. Appl. No. 18/298,625, mailed Aug. 8, 2024, 10 pages.

Final Rejection for U.S. Appl. No. 18/298,625, mailed May 8, 2024, 34 pages.

Non-Final Rejection or U.S. Appl. No. 18/298,625, mailed Nov. 8, 2023, 18 pages.

* cited by examiner

METHODS AND DEVICES FOR CODING AND DECODING A MULTI-VIEW VIDEO SEQUENCE

1. CROSS-REFERENCE TO RELATED APPLICATIONS

This Application is a continuation of U.S. application Ser. No. 18/298,625, filed Apr. 11, 2023, which is a continuation of U.S. application Ser. No. 17/439,173, filed Sep. 14, 2021, which is a Section 371 National Stage Application of International Application No. PCT/FR2020/050394, filed Feb. 27, 2020, published as WO 2020/188172 A1 on Sep. 24, 2020, not in English, the contents of which are hereby incorporated by reference in their entireties.

2. FIELD OF THE INVENTION

The invention concerns immersive videos, representative of a scene captured by one or more cameras. More particularly, the invention concerns coding and decoding such videos.

3. PRIOR ART

In an immersive video context, i.e. where the viewer has the feeling of being immersed in the scene, the scene is typically captured by a set of cameras, as illustrated in FIG. 1. These cameras can be of type 2D (cameras C1, C2, C3, C4 in FIG. 1) or of type 360, i.e. capturing the entire scene 360 degrees around the camera (camera C5 in FIG. 1).

All of these captured views are traditionally coded and then decoded by a terminal of the viewer. However, in order to provide a sufficient quality of experience, and thus a visual quality and a good immersion in the scene displayed to the viewer, displaying only the captured views is insufficient.

In order to improve the feeling of immersion in the scene, usually one or more views, referred to as intermediate views, are calculated from the decoded views.

These intermediate views can be calculated by a view "synthesis" algorithm. An example of a synthesis algorithm is illustrated in FIG. 2, showing mainly the inputs/outputs of a view synthesis algorithm. According to this example, from n views (here 1-4), the synthesis algorithm is able to synthesise a point of view "V" situated in a given volume, referred to as the viewing volume, depending on the positioning of the cameras. The n views and the synthesised view are composed of both texture data ($T_1$-$T_4$, $T_v$) and depth data ($D_1$-$D_4$, $D_v$) that represent the distance between the elements of the scene in relation to the cameras. The depth data is typically represented in the form of a depth map, i.e. an image indicating at each point of the image the depth associated with the object represented at that point.

These depth maps are either captured by specific cameras or calculated from the texture views. Compressing the captured views to represent the scene is a challenge, due to the huge amount of data considered.

Moreover, as the captured views are necessary to synthesise the intermediate views, a compromise between the coding efficiency of the views and the quality of the intermediate view synthesis is required.

MV-HEVC and 3D-HEVC encoders are two extensions of the 2D HEVC encoder ("High Efficiency Video Coding, Coding Tools and Specification", Matthias Wien, Signals and Communication Technology, 2015) adapted to code multi-view videos.

Such encoders take as input a set of views and optionally the associated depth maps. The MV-HEVC encoder does not apply any specific coding tool at block level. When coding an image of a current view, it simply uses an image of another view as a reference image, in addition to the previously coded/decoded images of the current view.

The 3D-HEVC encoder adds specific tools to the depth map coding, and uses more advanced inter-view redundancies, and inter-component redundancies, where the depth map coding takes advantage of the texture coding.

However, it appears that for 360° multi-view content, the redundancy between the views is not properly exploited by these two codecs. Their coding efficiency is therefore far from optimal. Moreover, nothing is done to preserve the zones that potentially lead to occlusions, which affects the quality of the images of the synthesised views.

FIG. 3 illustrates another method for coding multi-view videos and synthesising intermediate views on the decoder side.

According to this method, one or more basic views ($T_b$, $D_b$ in FIG. 3) are coded with a 2D encoder, for example an HEVC encoder, or with a multi-view encoder.

The other views ($T_s$, $D_s$) are processed to extract certain zones from each of these views.

In the case where not all of the captured views are transmitted to the decoder, or where the cameras are naturally distant, the occlusion zones increase. These zones correspond to objects that are hidden in the views transmitted to the decoder but that are necessary to reconstruct an image from any viewpoint in the viewing volume. The extracted zones can thus correspond to the occlusion zones that are hidden in the basic views, but visible in the views that are not transmitted to the decoder.

Sub-sampling the views can also lead to significant defects in the view synthesis, especially when an object is highly distorted depending on the viewing position, i.e. the synthesised viewpoint.

According to the method illustrated in FIG. 3, the extracted zones, hereafter also referred to as patches, are coded for example by a conventional 2D video encoder. On the decoder side, the synthesis algorithm can then produce one or more intermediate views from the basic views and the decoded patches.

Overall, the patches can transmit to the decoder information relating to a same zone that can be seen from a viewpoint of a basic view or from another viewpoint, so that a change in illumination between the two viewpoints or, for example, a poor projection quality, related to the object itself, for example in the case of a tilted object (extending over a certain depth range), can be taken into account.

In order to code the patches representing the extracted zones, it is necessary to code the texture of these patches and the associated depth. To simplify the coding and the representation of these patches, which can have different shapes, in general, the patches are stored in the form of rectangular images or at least in the form of quadrilaterals, also referred to as sub-images.

With a representation in the form of sub-images, it appears that the sub-images comprise useful data corresponding to the extracted zones and likely to be used for the synthesis of intermediate views, and non-useful data not initially belonging to the extracted patches.

For an efficient coding of the patches, it is necessary that the coding of the non-useful data has a minimal impact on the coding of the useful data.

Moreover, on the decoder side, it is necessary to transmit to the synthesis algorithm an item of information that will help it identifying the useful zones and the non-useful zones, so that it does not use non-useful zones during synthesis.

There is therefore a need to improve the prior art.

4. SUMMARY OF THE INVENTION

The invention improves the prior art. For this purpose, it concerns a method for decoding a data stream representative of a multi-view video. The data stream comprises at least coded data representative of at least one sub-image, the coded data comprising texture data and depth data associated with said texture data, and the sub-image comprising at least one zone, referred to as the useful zone, intended to be used for generating at least one image of at least one view.

Such a decoding method comprises:

decoding from said at least one data stream an indicator indicating whether the sub-image is coded according to a first method or according to a second method, when the indicator indicates that the sub-image is coded according to the first method, decoding for the sub-image a binary map indicating for at least one pixel of the sub-image whether or not said pixel belongs to the useful zone, decoding the texture data and the depth data of the sub-image, when the indicator indicates that the sub-image is coded according to the second method, the depth data of said sub-image for the pixels situated outside the useful zone comprising a decoded depth value.

According to the invention, it is thus possible to code and decode sub-images coding zones that are useful for the synthesis while limiting the coding cost of these sub-images. In particular, depending on the value of an indicator coded in the stream, the useful zone in a sub-image representing a patch can be determined by a synthesis algorithm when reconstructing a view, either from the depth information coded in the stream for the sub-image, or from a binary map coded and decoded from the stream.

According to the invention, unlike prior art techniques, it is thus not necessary to systematically code for the sub-image a validity binary map for identifying the useful zone of the sub-image. For example, at the encoder, a competition can be implemented to determine the best coding in terms of rate/distortion for the depth information of the patch. Such a competition compares the performance of a first method coding a binary map indicating which pixels belong to the useful zone and transmitted to the synthesis algorithm when synthesising a view, with the performance of a second method according to which the depth value of the pixels situated outside the useful zone is assigned a particular value.

When the sub-image is coded according to the first method, only the depth values of the pixels belonging to the useful zone are coded and decoded. Whereas when the sub-image is coded according to the second method, the depth value of all the pixels of the sub-image is coded and decoded, regardless of whether or not these pixels belong to the useful zone. The pixels of the sub-image that do not belong to the useful zone carry a particular decoded depth value that was determined at coding.

Such a particular value allows the synthesis algorithm not to use the pixels that do not belong to the useful zone when synthesising a view.

The sub-image can comprise texture and depth data relating to an occlusion zone that is not visible in the views coded in the data stream. Thus, coding such a sub-image improves the quality of the synthesis of a view that is not coded in the data stream.

In other embodiment variants, the sub-image can comprise texture and depth data relating to a zone that is visible from views coded in the data stream, but resulting in significant defects in the synthesis of a view. Coding such a sub-image improves the quality of the synthesis of this view by providing texture and depth refinements to the zone.

The proposed invention allows a better adaptation to the content of the views and the occlusion types. In particular, the first method preserves sharp contours for the occlusion zones during synthesis, while the second method saves coding costs by avoiding the transmission of the binary map. However, as the distinction between useful zone and non-useful zone in the sub-image is no longer made when coding according to the second method, the sharpness of the contours of the occlusion zones is not preserved.

The choice at the encoder between the first method and the second method can be made, for example, via a rate/distortion optimisation wherein the distortion is measured at the encoder from a partial synthesis of the reconstructed zone by the useful zone.

The invention also concerns a method for coding a data stream representative of a multi-view video, comprising:

coding at least one sub-image comprising texture data and depth data associated with said texture data, said sub-image comprising a zone, referred to as the useful zone, intended to be used for generating at least one image of at least one view, coding said at least one sub-image comprises:

determining a coding method for coding the sub-image between a first method and a second method, coding an indicator indicating whether the sub-image is coded according to the first method or according to the second method, when the indicator indicates that the sub-image is coded according to the first method, coding for the sub-image a binary map indicating for at least one pixel of the sub-image whether or not said pixel belongs to the useful zone, when the indicator indicates that the sub-image is coded according to the second method:

determining an assignment depth value, assigning the assignment depth value to the depth data of said sub-image for the pixels of the sub-image situated outside the useful zone, coding the texture data and the depth data of the sub-image.

According to a particular embodiment of the invention, the assignment depth value is determined from a minimum depth value determined over at least the useful zone of the sub-image, decreased by a predetermined value.

The minimum depth value is, for example, the depth value of the furthest (in terms of depth) point of the useful zone in the sub-image. The minimum depth value is decreased by a predetermined value so as to obtain a particular depth value that is distinct from the depth values of the points of the useful zone. The decrease by a predetermined value thus allows for the quantization errors when coding the depth data to be taken into account.

In addition, using a particular depth value that remains close to the depth values of the points of the useful zone limits the impact of the coding cost of the depth for the sub-image. Indeed, the occurrence of strong discontinuities in the depth information to be coded for the sub-image is limited.

Moreover, such an assignment depth value can be advantageously used by the synthesis algorithm. Indeed, in the event of a conflict during the synthesis of an image, a synthesis algorithm will naturally favour the objects situated in the foreground, therefore having a greater depth value, over the objects situated in the background. The use, for the pixels of the sub-image situated in the non-useful zone, of a depth value lower than the depth value of the pixels of the useful zone, thus indicates to the synthesis algorithm that the pixels carrying the lowest depth value do not belong to the useful zone, and their consideration by the synthesis algorithm will not be favoured in the event of conflicts when reconstructing a synthesised image.

According to another particular embodiment of the invention, when the indicator indicates that the sub-image is coded according to the second method, the decoding method, respectively the coding method, comprises decoding, respectively coding, an item of information representative of the assignment depth value, the assignment depth value corresponding to the depth value decoded, respectively coded, for the pixels situated outside the useful zone.

According to this particular embodiment of the invention, a binary map indicating the pixels belonging to the useful zone can thus be created for the sub-images coded according to the second method, since the decoder is aware of the assignment depth value that was assigned to the pixels situated outside the useful zone. It can thus identify from the depth value of the decoded pixels which pixels belong to the useful zone and which pixels are outside the useful zone. The binary map thus constructed can be transmitted to the synthesis algorithm. The information provided as input to the synthesis algorithm is thus identical, whether the sub-image was coded according to the first method or according to the second method.

According to another particular embodiment of the invention, the depth data of the sub-image coded in the data stream comprises, for at least one pixel of the sub-image, a residue determined by a difference between the depth value of said pixel and said assignment depth value.

This particular embodiment of the invention reduces the coding cost of the depth data for the sub-image when the sub-image is coded according to the second method. Indeed, when the sub-image comprises background information only, the dynamics of the depth data is low and coding this data as a residue is more advantageous.

According to another particular embodiment of the invention, an indicator is decoded or coded for said at least one sub-image indicating whether the depth data is coded by a residue determined by a difference between the depth value of said pixel and said assignment depth value.

This particular embodiment of the invention makes it possible to signal whether the depth data in the case of coding by the second method is coded by a residue or not. Indeed, depending on the type of information carried by the sub-image, the residue-based coding mode may or may not be advantageous. The residue-based coding may be advantageous when the sub-image carries information relating to occlusion zones, whereas it may be less attractive for sub-images comprising refinement information.

According to another particular embodiment of the invention, the decoding method further comprises:

determining the useful zone:

from the reconstructed depth data and the item of information representative of the decoded assignment depth value when the indicator indicates that the sub-image is coded according to the second method, from the decoded binary map when the indicator indicates that the sub-image is coded according to the first method, constructing a depth map for the sub-image in which an infinite value is assigned to the pixels situated outside the useful zone, transmitting said depth map to a synthesis module.

According to this particular embodiment of the invention, the infinite value assigned to the depth values makes it possible to simply indicate to the synthesis algorithm the pixels belonging to the useful zone and to the non-useful zone and avoids transmitting additional data to the synthesis module, such as a binary map indicating the useful zone and the non-useful zone.

According to another particular embodiment of the invention, the decoding method further comprises, when the indicator indicates that the sub-image is coded according to the second method:

determining the useful zone from the reconstructed depth data and the item of information representative of the decoded assignment depth value, constructing a binary map indicating, for at least one pixel of the sub-image, whether or not the pixel belongs to the useful zone, transmitting said binary map to a synthesis module.

According to another particular embodiment of the invention, at least two sub-images intended to be used for generating said at least one image of said at least one view are coded in the data stream, the minimum depth value is determined from each useful zone of said at least two sub-images.

According to another particular embodiment of the invention, the data stream comprises coded data of at least one view of the video, said at least one view corresponding to a view determined at coding from at least one source view.

The source view is defined here as an original view of the scene represented by the multi-view video. In other words, it is a sequence of images resulting from a capture of the scene by a camera.

According to this particular embodiment of the invention, at least one basic view transmitted to the decoder is a view determined from one or more source views. This determination can be performed at the time of coding or prior to coding.

For example, it can be a view synthesised from several source views or a view calculated/estimated from several source viewpoints.

For example, the determined view can correspond to a sequence of images in which each image is larger than a camera image and comprises all the images of the same instant from all the cameras of a 360°-capture camera array.

According to another particular embodiment of the invention, the decoding method further comprises receiving the texture data and the depth data of said sub-image, said sub-image originating from a synthesised intermediate view for a position and a viewing direction of a viewer in a viewing volume.

According to this particular embodiment of the invention, the data of the sub-image is provided to the decoder, upon request of a position and a viewing direction in the viewing volume. Such a particular embodiment of the invention makes it possible to provide the data of the sub-images on demand, when a viewer is navigating the multi-view video. The data in the corresponding refinement or occlusion zone is thus more adapted to the viewer's position and viewing direction.

The invention also concerns a device for decoding at least one data stream representative of a multi-view video, said at least one data stream comprising at least coded data representative of at least one sub-image, the coded data comprising texture data and depth data associated with said texture data, said sub-image comprising a zone, referred to as the useful zone, intended to be used for generating at least one image of at least one view, the decoding device is configured to:

- decode from said at least one data stream an indicator indicating whether the sub-image is coded according to a first method or according to a second method,
- when the indicator indicates that the sub-image is coded according to the first method, decode for the sub-image a binary map indicating for at least one pixel of the sub-image whether or not said pixel belongs to the useful zone,
- decode the texture data and the depth data of the sub-image, when the indicator indicates that the sub-image is coded according to the second method, the depth data of said sub-image for the pixels situated outside the useful zone comprising a decoded depth value.

According to a particular embodiment of the invention, such a decoding device is comprised in a terminal or a server.

The invention also concerns a device for coding a data stream representative of a multi-view video, configured to:

- code at least one sub-image comprising texture data and depth data associated with said texture data, said sub-image comprising a useful zone intended to be used for generating at least one image of at least one view, comprising:
  - determining a coding method for coding the sub-image between a first method and a second method,
  - coding an indicator indicating whether the sub-image is coded according to the first method or according to the second method,
  - when the indicator indicates that the sub-image is coded according to the first method, coding for the sub-image a binary map indicating for at least one pixel of the sub-image whether or not said pixel belongs to the useful zone,
  - when the indicator indicates that the sub-image is coded according to the second method:
    - determining an assignment depth value,
    - assigning the assignment depth value to the depth data of said sub-image for the pixels of the sub-image situated outside the useful zone,
- code the texture data and the depth data of the sub-image.

According to a particular embodiment of the invention, such a coding device is comprised in a terminal or a server.

The invention also concerns a data stream representative of a multi-view video, comprising at least coded data representative of at least one sub-image, the coded data comprising texture data and depth data associated with said texture data, said sub-image comprising a zone, referred to as the useful zone, intended to be used for generating at least one image of at least one view, the data stream comprises:

- an indicator indicating whether the sub-image is coded according to a first method or according to a second method,
- when the indicator indicates that the sub-image is coded according to the first method, coded data representative of a binary map indicating for at least one pixel of the sub-image whether or not said pixel belongs to the useful zone,
- when the indicator indicates that the sub-image is coded according to the second method, the depth data of said sub-image for the pixels situated outside the useful zone comprising a depth value.

According to a particular embodiment of the invention, the data stream further comprises, when the indicator indicates that the sub-image is coded according to the second method, an item of information representative of the assignment depth value.

According to another particular embodiment of the invention, the data stream comprises an indicator for said at least one sub-image indicating whether the depth data is coded by obtaining a residue determined by a difference between the depth value of a pixel and said assignment depth value.

According to another particular embodiment of the invention, the data stream further comprises coded data of at least one view of the video, said at least one view corresponding to a view synthesised at coding from at least one source view.

The decoding method, respectively the coding method, according to the invention can be implemented in various ways, notably in wired form or in software form. According to a particular embodiment of the invention, the decoding method, respectively the coding method, is implemented by a computer program. The invention also relates to a computer program comprising instructions for implementing the decoding method or the coding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means, such as a ROM, for example a CD-ROM or a microelectronic circuit ROM, a USB flash drive, or a magnetic recording means, for example a hard drive. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

5. LIST OF FIGURES

Other characteristics and advantages of the invention will emerge more clearly upon reading the following description of a particular embodiment, provided as a simple illustrative non-restrictive example, and the annexed drawings, wherein:

FIG. 1 diagrammatically illustrates an example of a multi-view scene capture system.

FIG. 2 illustrates an example of inputs/outputs of a view synthesis module.

FIG. 3 diagrammatically illustrates an example of a multi-view encoder based on the coding of patches.

6. DESCRIPTION OF AN EMBODIMENT OF THE INVENTION

Figure 4:
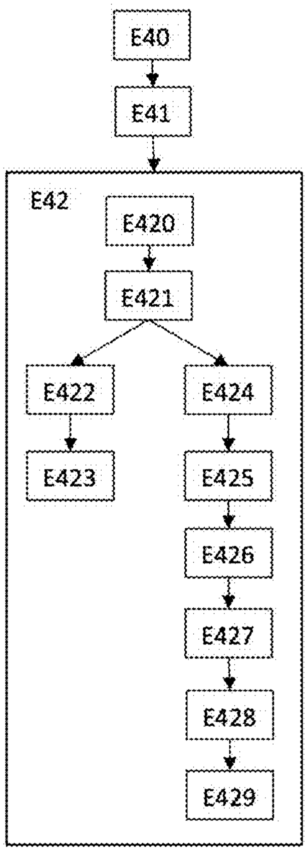
FIG. 4 illustrates steps of a coding method according to a particular embodiment of the invention.

FIG. 4 illustrates steps of a method for coding at least one data stream representative of a multi-view video according to a particular embodiment of the invention.

Figure 1:
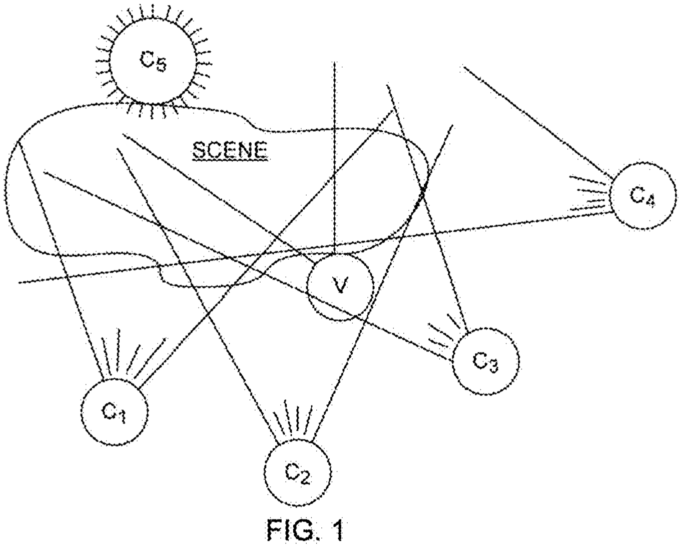
Figure 2:
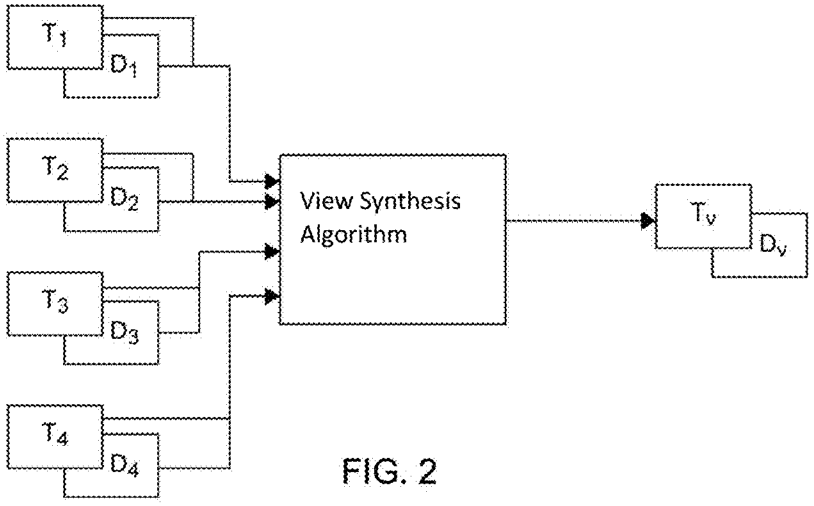
Figure 3:
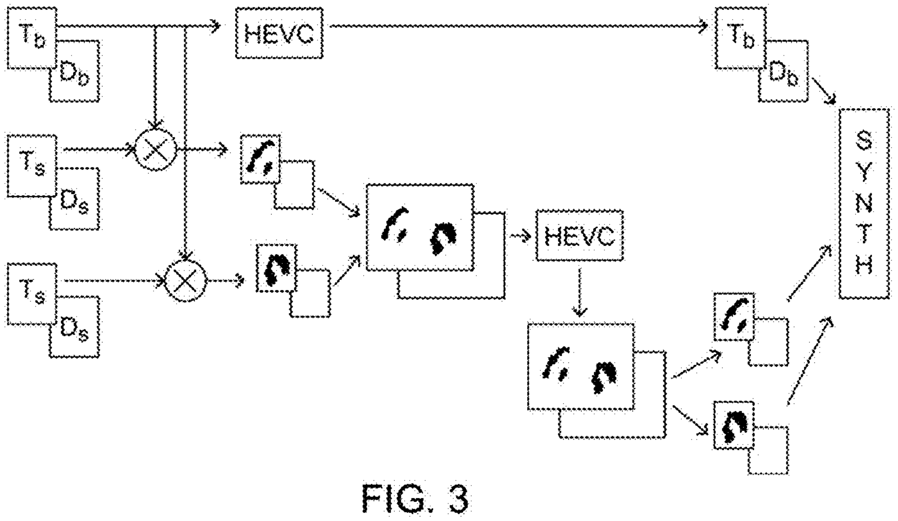

According to the invention, the multi-view video is coded according to a coding scheme as shown in relation to FIG. 3 wherein one or more basic views are coded in the data stream and wherein sub-images or patches comprising texture and depth data are also coded in the data stream and allow the decoder to synthesise other views of the scene that were not coded in the data stream. The steps of such a coding scheme relating to a particular embodiment of the invention are described below.

It is considered here for example that the scene was captured according to 4 viewpoints V0-V3 and that the depth maps d0-d3 associated with each of the images of the views were previously estimated. A view is defined here as a sequence of images representing the scene captured from a viewpoint. Each view is therefore a video, i.e. a sequence of images, and for each image of the view, a depth map is determined.

In a step E40, the views V0-V3 and the associated depth maps d0-d3 are coded and decoded, for example by an HEVC encoder, or any other suitable 2D or multi-view encoder. These views are considered as basic views and will be transmitted to the decoder. They can be used to synthesise intermediate views on the decoder side. As a variant, it is possible that not all views V0-V3 are coded, for example only one view, or 2 or 3 views may be coded and transmitted to the decoder.

According to a particular embodiment of the invention, in step E40, a basic view coded in the data stream corresponds to a view synthesised from one or more views V0-V3.

In a step E41, an intermediate view Vi is synthesised using the coded views that will be transmitted to the decoder. Typically, such an intermediate view Vi comprises texture data and depth data associated with the texture data.

In a step E42, from this intermediate view Vi and the coded/decoded basic views, one or more zones are extracted from the intermediate view Vi. The method is presented here in the case of a synthesised intermediate view Vi. Of course, the method applies identically if several intermediate views are synthesised, one or more zones being extracted from these intermediate views.

The object of the invention is not to determine the zones to be extracted. The method for extracting these zones will therefore not be developed further.

The extracted zones can correspond to occlusion zones, i.e. zones that are not visible in the basic views and visible in the intermediate view, or to zones that are already present in the basic views but provide an insufficient synthesis quality in the synthesised view, for example because of distortions appearing at synthesis. In the latter case, the synthesised intermediate view corresponds to a view captured by a camera. The intermediate view from which the zones are extracted can be a view that is captured by a camera but not coded in the data stream. It can therefore be synthesised on the decoder side and refined by the sub-images coded in the data stream.

The extracted zones are represented in the form of arbitrarily shaped patches. Hereafter, these patches are referred to as sub-images. A sub-image comprises texture data, depth data, a position in each view and a size.

It is understood that for the intermediate view, one or more sub-images can be extracted for the same image of the intermediate view. Similarly, a sub-image representing the same zone extracted from the intermediate view can be extracted for different images of the intermediate view. In this way, the texture and depth data of the sub-image then change over time and form a sequence of sub-images.

Figure 5:
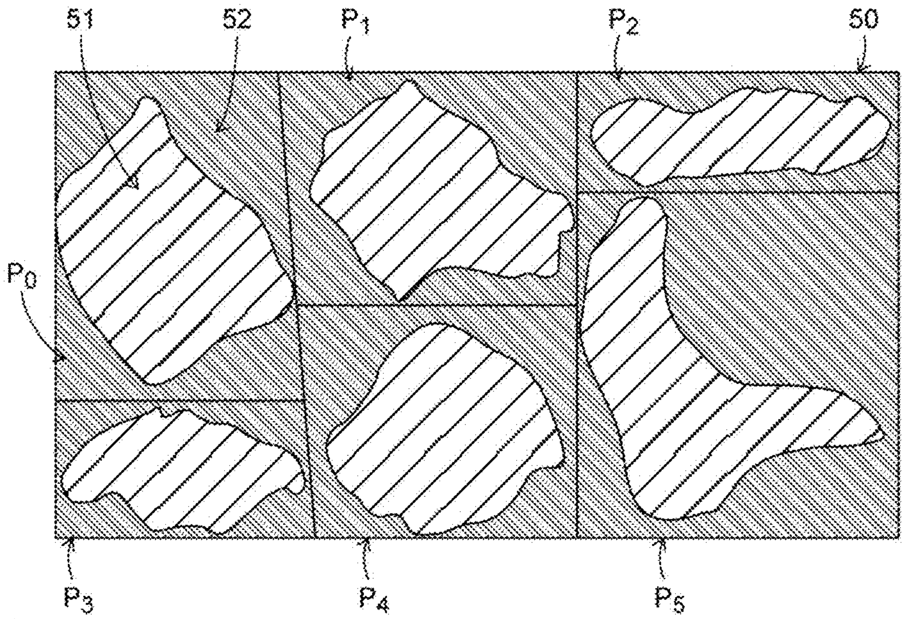
FIG. 5 illustrates an example of an image grouping sub-images to be coded.

Examples of sub-images $P_0$-$P_5$ extracted from an image of the intermediate view Vi are illustrated in FIG. 5. In the example in FIG. 5, the sub-images are grouped in a rectangular image 50 in order to facilitate their coding. It is understood that, depending on the embodiment variants of such an image, the image 50 can comprise sub-images extracted from different images of the intermediate view, or from a single image, or from the sub-images extracted from the intermediate view Vi and also from other intermediate views. Similarly, the sub-images can be coded without being grouped in a rectangular image. Each sub-image is then treated as an image or a sequence of images when the sub-image changes over time.

In FIG. 5, through the representation of the zones extracted from the intermediate view in a form suitable for coding (rectangular or at least quadrilateral shape), it appears that the sub-images comprise useful data (51, zones with large hatchings in FIG. 5) corresponding to the extracted zones and that are likely to be used for the synthesis of the intermediate view or other views, and non-useful data (52, zones with fine hatching in FIG. 5) that comprise texture and depth data of 0.

The useful data of the sub-image can be comprised in one zone of the sub-image or in several disjointed zones of the sub-image, so that the sub-image then comprises several zones that are useful for the synthesis.

The coding method according to the invention aims to reduce the coding cost of the non-useful zones.

The invention is described hereafter in the case where the sub-images are considered to be grouped in a large image 50. However, the general principle of the invention applies in a similar way to the case where the sub-images are not grouped in a large image but processed individually.

In a step E42, the sub-image(s) is/are coded. For this purpose, according to the invention, two methods for coding the sub-images can be used. For a given sub-image, a competition between the two coding methods is implemented in order to select the coding method offering the best rate/distortion compromise. An indicator is coded in the stream to indicate, for the sub-image, which coding method is used.

The two coding methods are described below.

According to a first coding method, the sub-image is coded using a binary map indicating, for a given pixel of the sub-image, whether the pixel belongs to the useful zone (for example, the pixel takes the value 1 in the binary map) or not (for example, the pixel takes the value 0 in the binary map).

Figure 6:
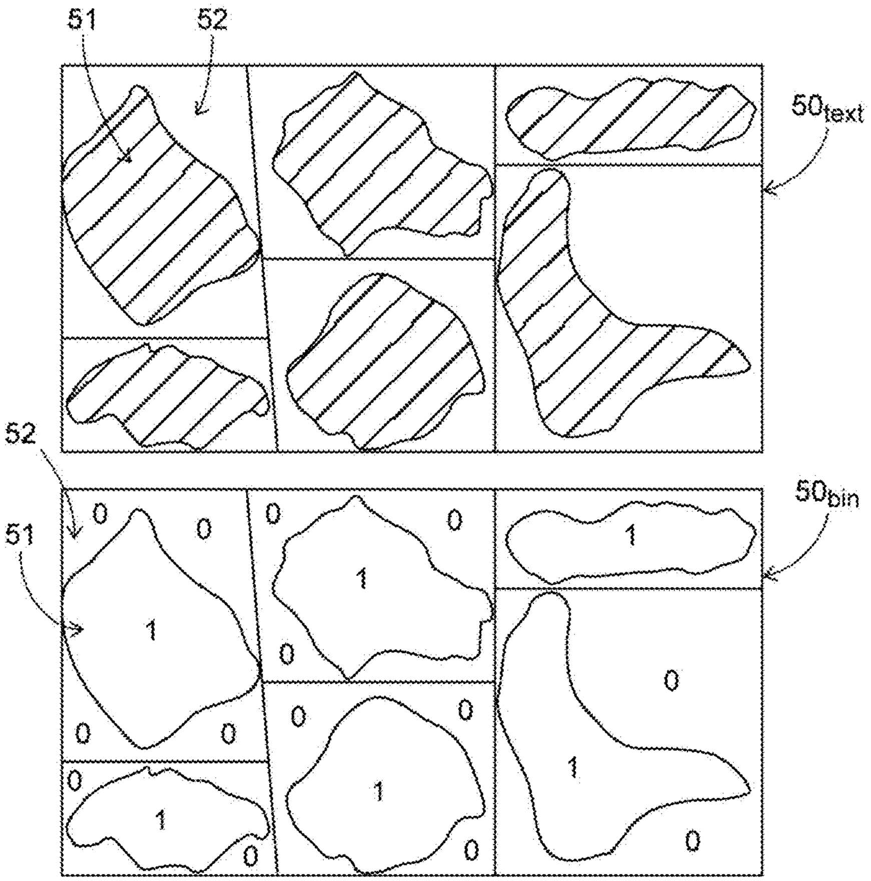
FIG. 6 shows an example of an image comprising sub-images and a corresponding binary map indicating the useful and non-useful zones of the sub-images for the image illustrated in FIG. 5.

FIG. 6 illustrates an example of an image ($\mathbf{50}_{text}$) comprising sub-images and a corresponding binary map ($\mathbf{50}_{bin}$) indicating the useful (51, hatched zones in the texture image $\mathbf{50}_{text}$) and non-useful (52, white zones in the texture image $\mathbf{50}_{text}$) zones of the sub-images for the image 50 illustrated in FIG. 5. According to this first coding method, only the texture and depth data of the pixels situated in the useful zone are coded and transmitted to the decoder, the associated binary map being coded for all the pixels of the sub-image.

It should be noted here that it is not possible to use a predefined value as a reference in the texture data, such as 0, for example, which would specify that the pixel in question is not useful. Indeed, after encoding and decoding the texture, the pixel value is not guaranteed, and may no longer be zero. Moreover, other null values may appear for pixels belonging to the useful zone.

According to a second coding method, the sub-image is coded by filling the non-useful zone for both the texture data and depth data. The sub-image is then coded in a standard manner by coding all the pixels of the sub-image.

For this purpose, in a step E420, the coding method to be used to code the sub-image is determined between the first method and the second method mentioned above. For example, a coding competition between the two methods is implemented and the method providing the best rate/distortion compromise is selected. In a known manner, such a competition is carried out by simulating the coding according to the two methods respectively, calculating the rate used by each method and the associated distortion calculated between the original values and the reconstructed values of the texture and/or depth data.

In a step E421, an indicator indicating whether the sub-image is coded according to the first method or according to the second method data is coded in the data stream. When the indicator indicates that the sub-image is coded according to the first method, the method proceeds to step E422. When the indicator indicates that the sub-image is coded according to the second method, the method proceeds to step E424.

In step E422, the binary map of the sub-image is coded. For example, an entropic coding is used.

In a step E423, the texture data and the depth data are coded for the sub-image, considering only the pixels situated in the useful zone of the sub-image. These pixels are identified using the binary map. The texture data and the depth data are coded in a standard way, for example by an HEVC encoder or any other 2D or 3D encoder.

In step E424, the indicator indicating that the sub-image is coded according to the second method, an assignment depth value d* is determined.

For example, the assignment depth value d* is determined from a minimum depth value $d_{min}$ determined over at least the useful zone of the sub-image, decreased by a predetermined value delta. The minimum depth value $d_{min}$ corresponds to the smallest depth value of the pixels of the sub-image belonging to the useful zone, i.e. to the depth of the pixel of the sub-image belonging to the useful zone, the furthest one: $d_{min}$=min (di), where di corresponds to the depth values of the pixels of the useful zone and min to the function returning the smallest value.

This minimum value $d_{min}$ is decreased by a value delta to take into account the quantization error introduced when coding the depth values. For example, the assignment value d* is obtained by $d^*=d_{min}-\text{delta}$.

Different values of delta are possible, for example, delta is equal to 10.

According to a particular embodiment of the invention, the minimum depth value is determined from the useful zone of several sub-images. For example, when the sub-images are grouped in a large image, the useful zones of all the sub-images are scanned in order to determine the minimum depth value between all the sub-images of the large image. Such a particular embodiment of the invention allows for a more consistent assignment depth value for all the sub-images of a large image.

Figure 8:
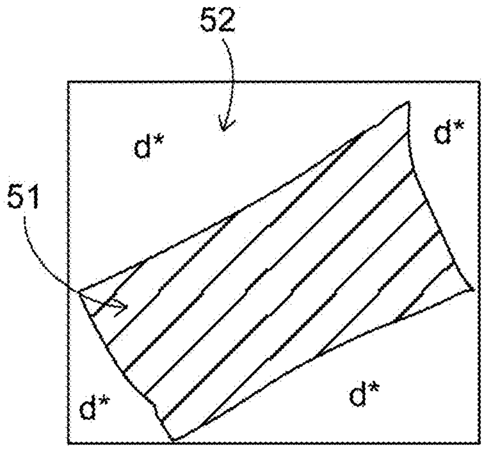
FIG. 8 illustrates a filling example of a non-useful zone of the depth of a patch according to a particular embodiment of the invention.

In a step E425, the assignment depth value d* is assigned as a depth value to the pixels situated outside the useful zone. Such a step is illustrated in FIG. 8 representing depth data of a sub-image. The pixels of the useful zone (51) comprise the depth value that was estimated for these pixels when extracting the useful zone from the intermediate view. The pixels of the non-useful zone (52) comprise the assignment depth value d*.

Figure 7:
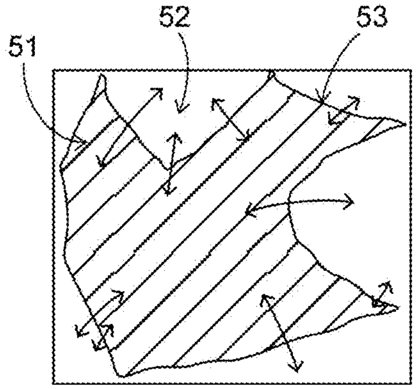
FIG. 7 illustrates a filling example of a non-useful zone of the texture of a patch according to a particular embodiment of the invention.

In a step E426, a texture value is also assigned to the pixels situated outside the useful zone. For example, the non-useful zone is filled by mirroring. The texture values of the pixels outside the useful zone are calculated to best reproduce the data present in the useful zone, as shown in FIG. 7. In FIG. 7, a sub-image is shown. Data of the useful zone (51) is propagated to the non-useful zone (52) symmetrically to the boundary (53) between the useful zone and the non-useful zone.

According to another example, the texture values of the pixels situated outside (52) the useful zone correspond to the average of the texture values of the pixels of the useful zone (51). In this example, the pixels of the non-useful zone are filled with the same value.

In a step E427, the texture data and the depth data for the sub-image are coded considering all the pixels of the sub-image. In other words, according to this second coding method, the pixels of the useful zone and the pixels of the non-useful zone are coded. The texture data and the depth data are coded in a standard way, for example by an HEVC encoder or any other 2D or 3D encoder.

According to a particular embodiment of the invention, the depth data is differentially coded with respect to the assignment depth value d*. According to this particular embodiment of the invention, a prediction residue is then calculated by res (x,y)=prof(x,y)−d*, where prof (x,y) is the depth value for the pixel (x,y) of the sub-image and res (x,y) is the residue value for the pixel (x,y) of the sub-image.

When coding the depth data for the sub-image, it is therefore the residue as mentioned above that is coded.

According to this particular embodiment of the invention, in order for the decoder to reconstruct depth data for the sub-image from the residue, the decoder must be aware of the assignment depth value d*.

Thus, according to this particular embodiment of the invention, in a step E428, the assignment depth value d* is coded in the data stream.

According to a variant of this particular embodiment of the invention, the differential coding of the depth data is placed in competition with a conventional coding of the depth data. Thus, according to this variant, in step E420, when testing the sub-image coding according to the second method, it is also determined whether or not the depth data according to this second coding method is coded by a residue. The residue-based coding of the depth data and the conventional coding of the depth data are simulated to select the coding mode providing the best rate/distortion compromise.

According to this embodiment variant of the invention, an item of information indicating which coding mode of the depth data is selected then needs to be coded in the data stream. Thus, in a step E429, a depth data coding indicator is coded in the data stream for the sub-image. Such an indicator indicates whether or not the depth data is coded by a residue.

Figure 9:
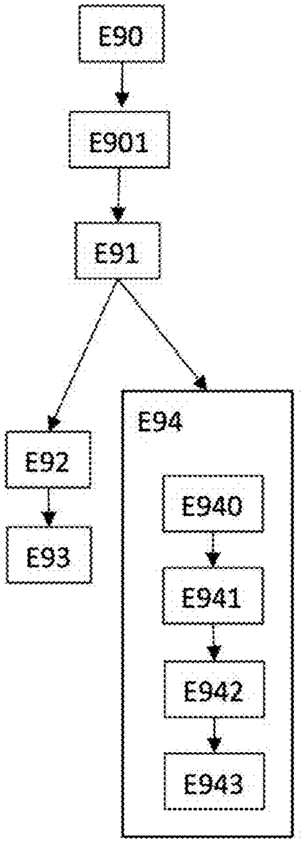
FIG. 9 illustrates steps of a decoding method according to a particular embodiment of the invention.

FIG. 9 illustrates steps of a method for decoding a data stream representative of a multi-view video according to a particular embodiment of the invention. For example, the data stream was generated by the coding method described in relation to FIG. 4.

According to the invention, the data stream comprises at least coded data relating to the coding of one or more basic views of the multi-view video and coded data representative of sub-images or patches comprising texture and depth data. Once decoded, these sub-images allow the decoder to synthesise other views of the scene that were not coded in the data stream, for example. The steps of such a decoding scheme relating to a particular embodiment of the invention are described below.

In a step E90, the basic views and the associated depth maps are decoded from the data stream.

According to a particular embodiment of the invention, a basic view decoded from the data stream corresponds to a view synthesised at the encoder from one or more captured views.

A sub-image coded in the data stream is then decoded. A sub-image is defined here as a sub-image representing a useful zone extracted at the encoder from an intermediate view. This sub-image can be grouped with other sub-images in a larger image.

In a step E91, an indicator indicating for the sub-image whether the sub-image is coded according to the first method or according to the second method, that were described above, is decoded.

When the indicator indicates that the sub-image is coded according to the first method, the method proceeds to step E92. When the indicator indicates that the sub-image is coded according to the second method, the method proceeds to step E94.

In step E92, a binary map is decoded for the sub-image. Such a binary map indicates for a given pixel of the sub-image whether or not the pixel belongs to the useful zone.

In a step E93, the texture data and the depth data of the sub-image are decoded and reconstructed considering only the pixels situated in the useful zone of the sub-image. These pixels are identified using the binary map.

At the end of the reconstruction, the pixels of the sub-image situated outside the useful zone comprise texture values and depth values of 0.

When the indicator indicates that the sub-image is coded according to the second method, in step E94, the texture data and the depth data of the sub-image are decoded as follows.

In a step E940, the texture data and the depth data for the sub-image are decoded and reconstructed in a standard manner considering all the pixels of the sub-image. At the end of the reconstruction, all the pixels of the sub-image comprise a texture value and a depth value. The pixels of the sub-image situated outside the useful zone comprise a texture value and a depth value as determined during coding.

According to a particular embodiment of the invention, when the indicator indicates that the sub-image is coded according to the second method, the decoder does not distinguish between the useful zone and the non-useful zone of the sub-image.

However, the decoded depth value for the pixels of the non-useful zone of the sub-image allows a synthesis algorithm not to use these pixels when synthesising an intermediate view. Indeed, according to a particular embodiment of the invention, such pixels were assigned a depth value determined from the minimum depth value of the zone of the sub-image, decreased by a value allowing the quantization errors to be taken into account. In this way, these pixels are considered by the synthesis algorithm as the furthest points.

According to another particular embodiment of the invention, in a step E941, an item of information representative of the assignment depth value d* assigned at coding to the pixels situated outside the useful zone of the sub-image is decoded from the data stream.

According to this particular embodiment of the invention, a binary map can thus be constructed for the sub-image in order to identify the pixels of the useful zone and the pixels of the non-useful zone, in the case for example where such a map would be necessary for the synthesis algorithm.

As a variant of this particular embodiment, the depth data of the sub-image were differentially coded with respect to the assignment depth value d*.

Thus, according to this embodiment variant, in a step E943, the depth data of the sub-image is reconstructed by adding the decoded assignment depth value d* to the depth residue values of the sub-image that were decoded in step E940.

According to another variant, in a step E942, a depth data coding indicator for the sub-image is decoded from the data stream. Such a coding indicator indicates whether or not the depth data is differentially coded.

According to a particular embodiment of the invention, the decoder operates in client-server mode with a server providing the data of a multi-view video in which a viewer is navigating. According to this particular embodiment of the invention, the decoding method comprises a preliminary step E901 for receiving the texture data and the depth data of the sub-image. For example, such data of the sub-image is received following a request issued by the decoder for a position and a viewing direction corresponding to the position and the viewing direction of a viewer in the viewing volume, or for a position and a viewing direction close to those of the viewer.

Figure 10:
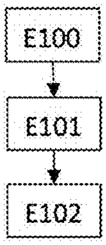
FIG. 10 illustrates steps of a decoding method according to another particular embodiment of the invention.

FIG. 10 illustrates steps of the decoding method according to another particular embodiment of the invention. According to this particular embodiment of the invention, an infinite value is assigned to the depth values of the pixels of the reconstructed sub-image that do not belong to the useful zone so that the synthesis algorithm can identify the useful zone and the non-useful zone.

For this purpose, in a step E100, the useful zone of the reconstructed sub-image is determined. When the indicator decoded in step E91 indicates that the sub-image is coded according to the second method, the useful zone is determined from the reconstructed depth data and the decoded assignment depth value d*. When the indicator decoded in step E91 indicates that the sub-image is coded according to the first method, the useful zone is determined from the binary map decoded in step E92.

In a step E101, a depth map for the sub-image is constructed, in which the pixels of the useful zone take their decoded depth value and the pixels situated outside the useful zone are assigned an infinite value.

In a step E102, the depth map is transmitted to a synthesis module.

Figure 11:
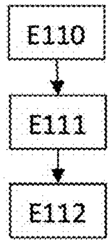
FIG. 11 illustrates steps of a decoding method according to another particular embodiment of the invention.

FIG. 11 illustrates steps of the decoding method according to another particular embodiment of the invention.

When the indicator decoded in step E91 indicates that the sub-image is coded according to the second method, in a step E110, the pixels of the useful zone are determined from the reconstructed depth data and the decoded assignment depth value d*.

In a step E111, a binary map is constructed for the sub-image. Such a binary map indicates for a given pixel of the sub-image whether or not the pixel belongs to the useful zone. Such a binary map is similar to the binary map that would have been decoded if the sub-image had been coded according to the first method.

In a step E112, the binary map is transmitted to a synthesis module.

Figure 12:
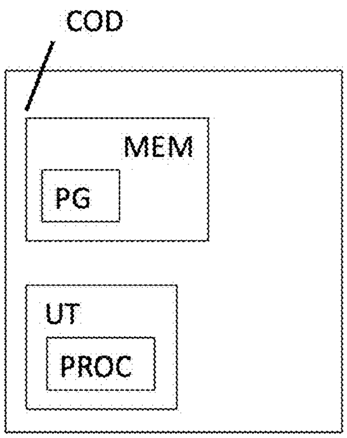
FIG. 12 illustrates an example of the architecture of a coding device according to a particular embodiment of the invention.

FIG. 12 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

Figure 13:
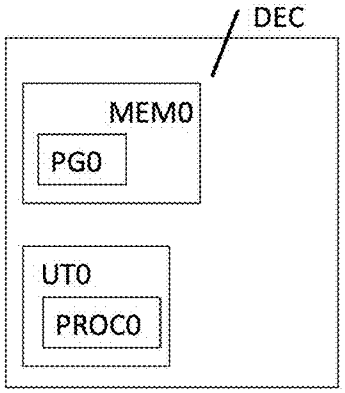
FIG. 13 illustrates an example of the architecture of a decoding device according to a particular embodiment of the invention.

FIG. 13 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEMO, a processing unit UTO, equipped for example with a processor PROC0, and driven by the computer program PG0 stored in the memory MEMO. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UTO implements the steps of the decoding method described above, according to the instructions of the computer program PG0.

Figure 14:
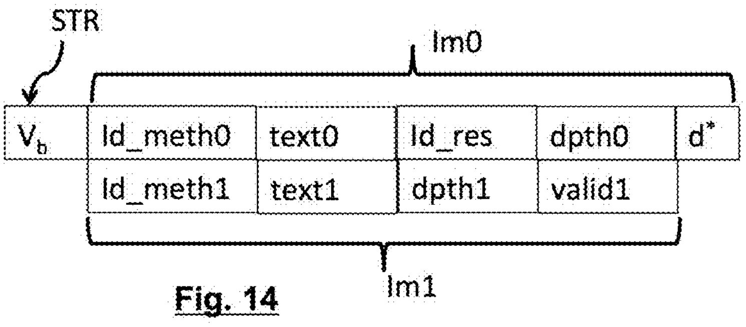
FIG. 14 illustrates a data stream example according to particular embodiments of the invention.

FIG. 14 illustrates a data stream STR example according to particular embodiments of the invention. For example, the data stream STR is generated by the coding method as described in relation to FIG. 4.

With reference to FIG. 14, the data stream STR is representative of a multi-view video, and comprises in particular coded data $V_b$ representative of one or more basic views, and coded data representative of at least one sub-image comprising texture data (text0, text1) and depth data (dpth0, dpth1) associated with said texture data.

According to a particular embodiment of the invention, a basic view coded in the data stream corresponds to a view synthesised at coding from at least one source view of the scene.

The data stream STR illustrated in FIG. 14 is an illustrative example. It is presented here comprising two sub-images (Im0, Im1). The sub-images comprised in the data stream comprise a useful zone intended to be used for generating at least one image of at least one view of the scene captured by the multi-view video.

Depending on the various particular embodiments of the invention, the data stream STR comprises the following data for the sub-images:

- an indicator (Id_meth0, Id_meth1) indicating whether the sub-image is coded according to the first method or according to the second method, that were described above,
- when the indicator indicates that the sub-image is coded according to the first method (Id_meth1 in the example described here), coded data representative of a binary map (valid1) indicating for a given pixel of the sub-image whether or not said pixel belongs to the useful zone.

According to a particular embodiment of the invention, when the indicator indicates that the sub-image is coded according to the second method (Id_meth0 in the example described here), the data stream STR comprises an item of information representative of the assignment depth value d*.

According to another particular embodiment of the invention, when the indicator indicates that the sub-image is coded according to the second method, the data stream STR comprises a coding indicator (Id_res) for the sub-image indicating whether the depth data is coded by obtaining a residue determined by a difference between the depth value of a pixel and the assignment depth value d*.

The example described above is merely illustrative and non-restrictive. The coded data described above can be comprised in the same data stream or several data streams or sub-streams of the same data stream. Also, some of the data described above and other data not described can be comprised in metadata associated with one or more data streams.

For example, the texture data and the depth data can be coded in separate streams.

According to another example, the coded data of the basic views can be comprised in a video data stream, and the coded data relating to the sub-images can be comprised in metadata associated with the video data stream.

What is claimed is:

1. A method implemented by a decoding device and comprising:

decoding at least one data stream representative of a multi-view video, said at least one data stream comprising at least coded data representative of at least one sub-image, the coded data comprising texture data and depth data associated with said texture data, said sub-image comprising at least one zone referred to as a useful zone, and at least one zone referred to as a non-useful zone, said useful zone corresponding to a zone extracted from a view of the multi-view video that is not coded in the data stream, the useful zone being intended to be used for generating at least one image of at least one view, the decoding comprising:

decoding from said at least one data stream an indicator indicating whether said sub-image is coded according to a first method or according to a second method, when the indicator indicates that said sub-image is coded according to the first method:

decoding for said sub-image a binary map indicating, for at least one pixel of said sub-image, whether or not said pixel belongs to the useful zone, and in response to said pixel belonging to the useful zone, decoding for the sub-image texture data and depth data associated with said texture data, when the indicator indicates that the sub-image is coded according to the second method:

decoding the texture data of the sub-image, decoding from said at least one data stream an indicator representative of an assignment depth value of the depth data of the sub-image, decoding the depth data of said sub-image from said assignment depth value, constructing a map indicating, for at least one pixel of the sub-image, whether or not the pixel belongs to the useful zone, from the decoded depth data and the decoded indicator representative of the assignment depth value, and transmitting said map to a synthesis module.

2. The method according to claim 1, wherein the assignment depth value corresponds to a decoded depth value for the pixels situated outside the useful zone.

3. The method according to claim 2, wherein the depth data of the sub-image coded in the data stream comprises, for at least one pixel of the sub-image, a residue determined by a difference between the depth value of said pixel and said assignment depth value.

4. The method according to claim 3, comprising decoding from the data stream an indicator for said at least one sub-image indicating whether the depth data is coded by a residue determined by a difference between the depth value of said pixel and said assignment depth value.

5. The method according to claim 1, further comprising:

determining the useful zone of the sub-image from the decoded binary map when the indicator indicates that the sub-image is coded according to the first method, constructing a depth map for the sub-image in which an infinite value is assigned to the pixels situated outside the useful zone, transmitting said depth map to a synthesis module.

6. The method according to claim 1, wherein said at least one data stream comprises coded data of at least one view of the video, said at least one view corresponding to a view determined at coding from at least one source view.

7. The method according to claim 1, further comprising receiving the texture data and the depth data of said sub-image, said sub-image originating from a synthesised intermediate view for a position and a viewing direction of a viewer in a viewing volume.

8. The method according to claim 1, wherein said map constructed for the sub-image is a depth map in which an infinite value is assigned to the pixels situated outside the useful zone.

9. The method according to claim 1, wherein said map constructed for the sub-image is a binary map.

10. The method according to claim 1, further comprising transmitting said binary map to the synthesis module when the indicator indicates that the sub-image is coded according to the first method.

11. A method implemented by a coding device and comprising:

coding a data stream representative of a multi-view video, comprising coding at least one sub-image comprising texture data and depth data associated with said texture data, said sub-image comprising at least one zone referred to as a useful zone and at least one zone referred to as a non-useful zone, said useful zone corresponding to a zone extracted from a view of the multi-view video that is not coded in the data stream, the useful zone being intended to be used for generating at least one image of at least one view, coding said at least one sub-image comprising:

determining a coding method for coding said sub-image between a first method and a second method, coding an indicator indicating whether said sub-image is coded according to the first method or according to the second method, when the indicator indicates that said sub-image is coded according to the first method:

coding for the sub-image a binary map indicating, for at least one pixel of said sub-image, whether or not said pixel belongs to the useful zone, and, if said pixel belongs to the useful zone, decoding for the sub-image texture data and depth data associated with said texture data, when the indicator indicates that said sub-image is coded according to the second method:

coding the texture data of the sub-image, coding, in said at least one data stream, an indicator representative of an assignment depth value of the depth data of the sub-image, and coding the depth data of said sub-image from said assignment depth value.

12. The method according to claim 11, wherein the assignment depth value corresponds to a coded depth value for the pixels situated outside the useful zone.

13. The method according to claim 12, wherein the depth data of the sub-image coded in the data stream comprises, for at least one pixel of the sub-image, a residue determined by a difference between the depth value of said pixel and said assignment depth value.

14. The method according to claim 13, comprising coding in the data stream an indicator for said at least one sub-image indicating whether the depth data is coded by a residue determined by a difference between the depth value of said pixel and said assignment depth value.

15. The method according to claim 11, wherein the assignment depth value is determined from a minimum depth value determined over at least the useful zone of the sub-image, decreased by a predetermined value.

16. The method according to claim 15, wherein at least two useful zones belonging respectively to at least two sub-images are coded in the data stream, said at least two useful zones being intended to be used for generating said at least one image of said at least one view, the minimum depth value is determined from said at least two useful zones.

17. The method according to claim 11, wherein said at least one data stream comprises coded data of at least one view of the video, said at least one view corresponding to a view determined at coding from at least one source view.

18. A device comprising:

a processor; and a non-transitory computer-readable medium comprising instructions stored thereon which when executed by the processor configure the device to decode at least one data stream representative of a multi-view video, said at least one data stream comprising at least coded data representative of at least one sub-image, the coded data comprising texture data and depth data associated with said texture data, said sub-image comprising at least one zone referred to as a useful zone and at least one zone referred to as a non-useful zone, said useful zone corresponding to a zone extracted from a view of the multi-view video that is not coded in the data stream, the useful zone being intended to be used for generating at least one image of at least one view, the decoding comprising:

decode from said at least one data stream an indicator indicating whether said sub-image is coded according to a first method or according to a second method, when the indicator indicates that said sub-image is coded according to the first method:

decode for said sub-image a binary map indicating for at least one pixel of said sub-image whether or not said pixel belongs to the useful zone, and if said pixel belongs to the useful zone, decoding for the sub-image texture data and depth data associated with said texture data, when the indicator indicates that the sub-image is coded according to the second method:

decode the texture data of the sub-image, decode from said at least one data stream an indicator representative of an assignment depth value of the depth data of the sub-image, decode the depth data of said sub-image from said assignment depth value, construct a map indicating, for at least one pixel of the sub-image, whether or not the pixel belongs to the useful zone, from the decoded depth data and the decoded indicator representative of the assignment depth value, transmit said map to a synthesis module.

* * * * *